United States Patent [19]

Goodwin

[11] Patent Number: 4,659,275
[45] Date of Patent: Apr. 21, 1987

[54] BARGE TIPPER

[75] Inventor: Peter J. Goodwin, Johannesburg, South Africa

[73] Assignee: Techni Multidiscipline Services (Proprietary) Limited, Johannesburg, South Africa

[21] Appl. No.: 733,373

[22] Filed: May 13, 1985

[30] Foreign Application Priority Data

May 16, 1984 [ZA] South Africa .................. 84/3687

[51] Int. Cl.$^4$ .................. B63B 35/02; B65G 67/60
[52] U.S. Cl. .................. 414/137; 114/38; 198/535; 198/861.2; 414/139; 414/356; 414/360; 414/365
[58] Field of Search .................. 114/27, 32, 33, 34, 114/38, 258, 259, 260, 263; 414/137, 138, 139, 354, 356, 359, 360, 365, 372; 198/861.2, 535

[56] References Cited

U.S. PATENT DOCUMENTS

| 1,453,666 | 5/1923 | Franovich | 414/137 X |
| 3,978,806 | 9/1976 | Kirby et al. | 114/260 |
| 4,382,418 | 5/1983 | Ray | 114/263 |
| 4,409,917 | 10/1983 | Kramer Da Luz | 114/38 |

FOREIGN PATENT DOCUMENTS

| 384066 | 7/1932 | United Kingdom | 414/356 |
| 1154932 | 6/1969 | United Kingdom | 414/137 |
| 1213628 | 11/1970 | United Kingdom | 414/139 |

Primary Examiner—L. J. Paperner
Assistant Examiner—Janice Krizek
Attorney, Agent, or Firm—Burns, Doane, Swecker & Mathis

[57] ABSTRACT

A barge tipper comprises a cylindrical floating apparatus 10 defining a chamber 18 into which a barge 28 can be floated. End doors 16 at either end of the apparatus 10 are closed and the barge 28 is clamped in position by hydraulically operated clamps 20. Water is pumped from the chamber 18 to ballast tanks 12 and 14, causing the apparatus to rotate and thus tipping the barge 28. The contents of the barge 28 flow into a first conveyor 22 and are delivered to a second circumferential conveyor 24 which feeds the material to an external conveyor 26.

4 Claims, 3 Drawing Figures

4,659,275

BARGE TIPPER

BACKGROUND TO THE INVENTION

The invention relates to barge tippers.

The invention relates more particularly to tippers for river and ocean going barges which have no independent propulsion devices of their own and which are towed or pushed singly or in groups to suitable points of discharge. Barge tippers are not presently known and barges are normally emptied by grabs or bucket conveyors for example at docks or adjacent loading vessels. Although this form of unloading of barges has been widely practised for several years it is not altogether satisfactory because it can take considerable time and complete emptying of the barge is achieved rarely or only with difficulty.

It is an object of the invention to provide an improved apparatus and method of emptying barges.

SUMMARY OF THE INVENTION

According to the invention there is provided a barge tipper which comprises a generally cylindrical floating apparatus defining a chamber into which a barge can be floated, closable end gates arranged to at least partially close-off and seals the ends of the chamber, means for holding the barge fixedly within the chamber, means for rotating the apparatus to tilt the barge so that material therein is discharged from the barge, and a conveyor means for collecting the discharged material and conveying it away from the apparatus.

Preferably, the apparatus includes one or more pumps for pumping water out of the apparatus after the end gates are closed.

The apparatus may be provided with one or more ballast tanks positioned longitudinally at one side thereof which when filled cause or tend to cause the apparatus to rotate. The ballast tanks may comprise the means for tilting the apparatus alone or form part of such means.

The water pumped from the apparatus when the end gates are closed may be pumped into the ballast tanks.

BRIEF DESCRIPTION OF THE DRAWINGS

A barge tipper apparatus according to the invention will now be described by way of example with reference to the accompanying schematic drawings in which.

DESCRIPTION OF A PREFERRED EMBODIMENT

Figure 1:
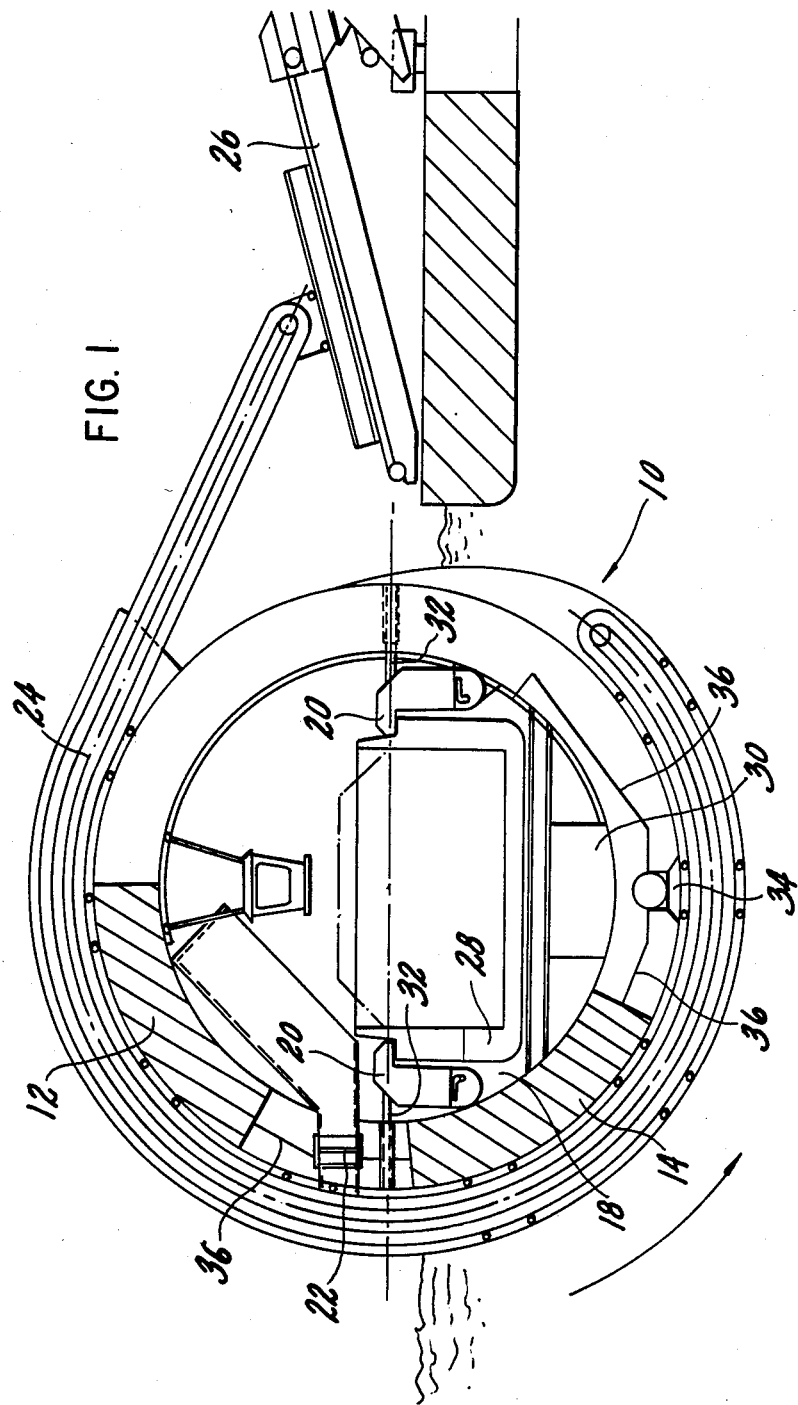
FIG. 1 shows a partly sectioned elevation of the apparatus.

Referring to the drawings, the tipper apparatus consists of a double walled cylindrical floating vessel 10 located in use by anchor lines or dock lines as appropriate. The apparatus includes two longitudinal ballast tanks 12 and 14 and has at each end lock gates 16 arranged to seal off the ends of the apparatus. The apparatus contains an open chamber 18, having dimensions suitable to surround a barge 28, and upper clamps 20 to urge against the top of the barge 28 and to secure the barge in the chamber 18, as required. Chain conveyors 22 are positioned to collect material which flows out of the barge when it is tilted and feed that material longitudinally to a material discharge outlet of the conveyors 22 to discharge the material onto a central chain conveyor 24. The conveyor 24 extends around the circumference at the centre of the apparatus and feeds material in use to a separate transfer conveyor 26 which feeds material directly into a ship or dock silo as required. A guideway 40 extends circumferentially around the apparatus and is rotatable therewith. The guideway terminates in an exit opening 41. The conveyor 24 is disposed within the guideway and projects through the opening 41 to extend to the transfer conveyor 26.

Figure 2:
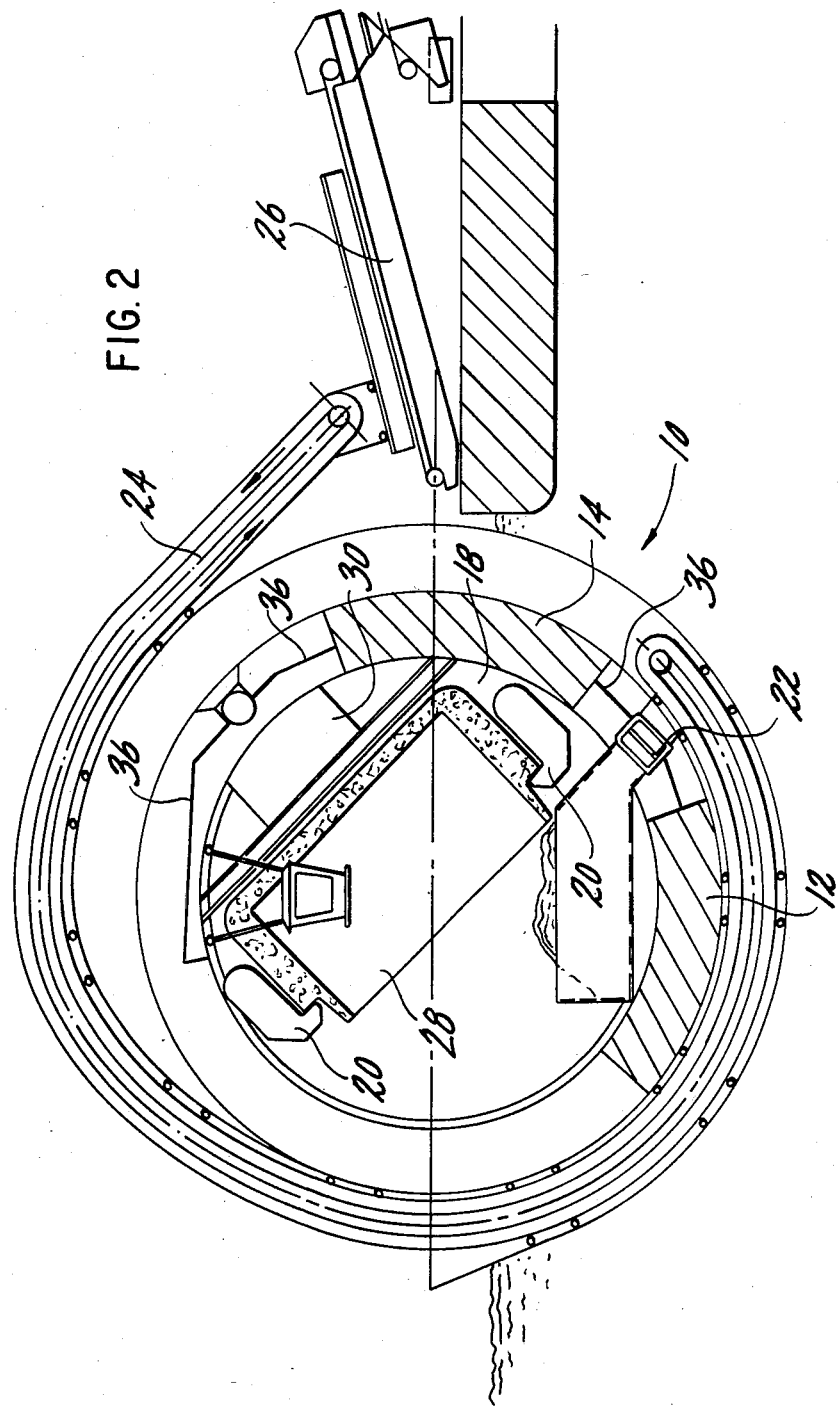
FIG. 2 shows the same view as FIG. 1 in which the apparatus has been rotated to a different relative position.
Figure 3:
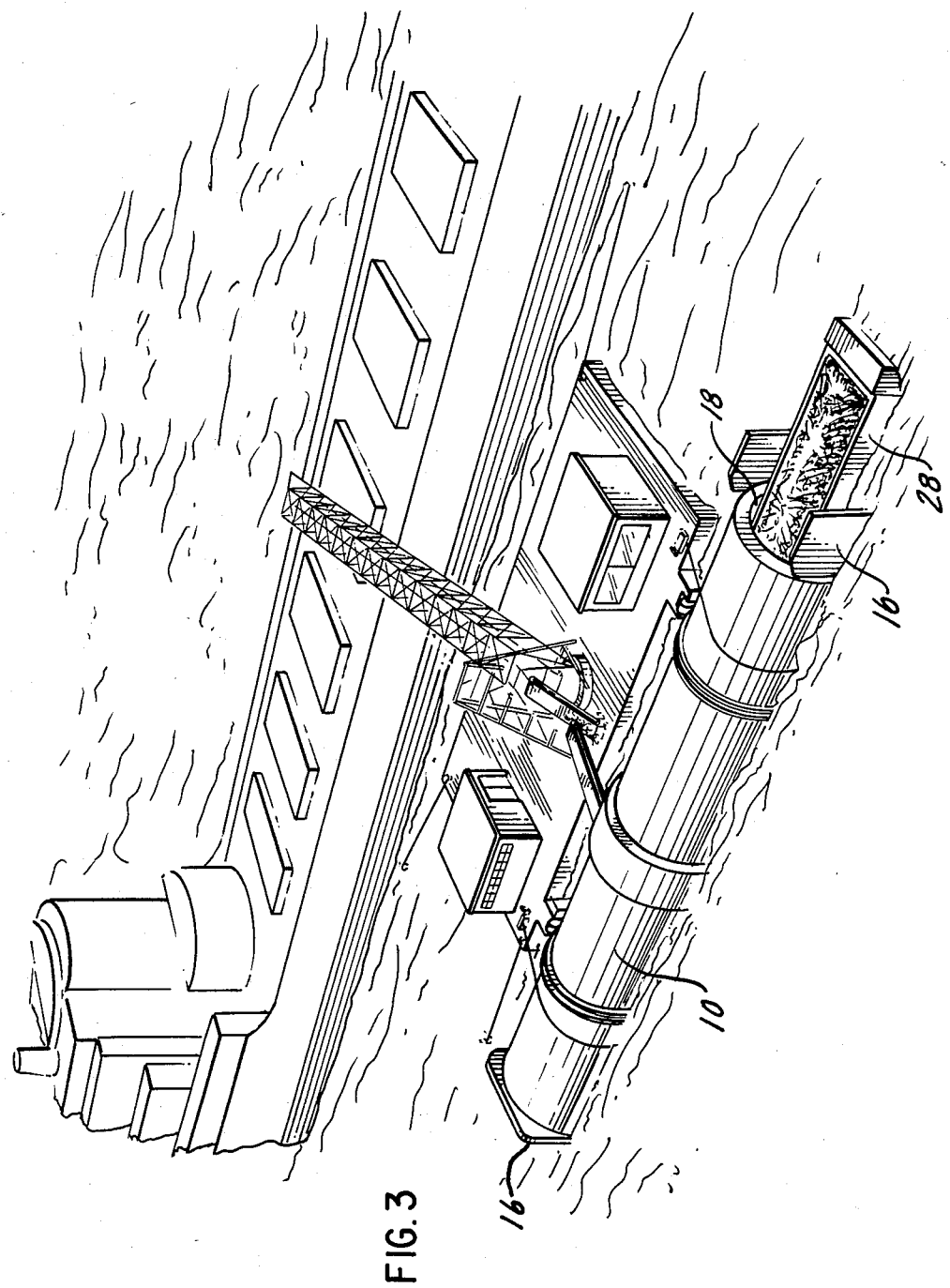
FIG. 3 is a pictorial view of the apparatus in use.

In use, the apparatus floats in its position shown in FIG. 1 and the barge 28 is pushed or winched into the apparatus and the gates 16 closed. Water is then pumped by a pump 34 from the chamber 18 into the ballast tanks 12 and 14 via pipes 36 and the apparatus begins to rotate relative to the conveyor 24 toward a barge-discharge position about its longitudinal axis. The clamps 20 must be positioned to hold the barge firmly in the vessel 18. The rate and angle of rotation is controlled by the pumping and by selective operation of various valves provided between the pump and the ballast tanks 12 and 14. As the barge 28 tilts, its contents spill onto the chain conveyors 22 which carry the material to a section 24A of the centrally positioned conveyor 24 which feeds the material around the apparatus to the conveyor 26. The apparatus can be rotated to the position shown in FIG. 2 to fully empty the barge.

When the barge is empty, water from the ballast tanks 12 and 14 is pumped into the chamber 18, or it may be discharged in the surrounding sea or river, so that the apparatus rotates to its initial position with the barge 28 once again upright. The clamps 20 must be released to some extent once the barge has been righted to allow the barge 28 to take up its natural floating position. The gates 16 are then opened and the barge 28 is then winched or pushed out of the apparatus and a next barge is positioned in the apparatus.

The ballast tanks 12 and 14 are designed to provide the force necessary, as they are filled, to rotate the apparatus. The filling and emptying of the tanks 12 and 14 may require relatively careful control and it is normally arranged that the tanks 12 and 14 can also be filled and emptied selectively from and into the surrounding river or sea. It will be appreciated that when the barge is fully loaded a greater force is required to rotate the apparatus than when the barge is initially only partially full. The amount of initial contents also affects the volume of water initially in the chamber 18. This may simply be allowed to drain out of the chamber 18 and the ballast tanks filled with water from the surrounding river or sea to cause the apparatus to tilt. The draining of the chamber 18 can be achieved by suitably positioned drain ports in the upper regions of the sides of the chamber 18. In fact the chamber 18 in this case may be in the form of laterally and upwardly disposed support beams, in other words, the chamber 18 may be in the form of a skeleton arranged to surround the barge as required to hold it in position during tilting. Where a skeleton structure is provided it is also possible to arrange the structural members of the skeleton to be relatively adjustable if desired so that the effective overall dimensions of the vessel 18 can be adjusted to suit different sized barges. In one arrangement, the structural members are movable under the control of a hydraulic ram 30.

The clamps 20 may be continuously and automatically adjustable, under the control of hydraulic rams 32 for example. This is to allow the clamps 20 to urge against the top of the barge 28 with adequate force at all times and yet prevent the clamps 20 becoming overstrained as could otherwise happen if they are not released during righting of an empty barge which will float higher in the water than it did initially when loaded.

I claim:

1. A barge tipper comprising a generally cylindrical floating apparatus defining a chamber into which a barge can be floated, at least one closeable end gate arranged to at least partially close-off and seal the chamber, means for holding the barge fixedly within the chamber, means for rotating the apparatus and the barge about a longitudinal axis of the apparatus between a barge-receiving position and a barge-discharging position for discharging material from the barge, at least one first conveyor rotatable with the apparatus and arranged longitudinally alongside the barge for receiving material discharged from the barge, the first conveyor including a material discharging outlet, a guideway mounted on the apparatus so as to extend circumferentially around at least a portion of the apparatus and arranged to rotate with the apparatus, the guideway terminating in an exit opening, a second conveyor disposed within the guideway so as to extend circumferentially around at least a portion of the apparatus, the apparatus being rotatable relative to the second conveyor, the second conveyor including a section thereof located to receive material discharged from the outlet of the first conveyor when the apparatus has been rotated to the barge-discharging position, the second conveyor projecting through the exit opening of the guideway and extending to an external transfer site.

2. A barge tipper according to claim 1, wherein said apparatus includes lateral and upright structural members arranged to surround the barge and hold it in position during rotation, the structural members being adjustable to vary the size of the chamber to accommodate barges of different sizes.

3. A barge tipper according to claim 1, wherein the second conveyor is located intermediate the ends of the apparatus, there being a plurality of first conveyors arranged to convey material to the second conveyor.

4. A barge tipper according to claim 1, wherein the section of the second conveyor which receives material from the first conveyor is located beneath the apparatus.

* * * * *